(12) United States Patent
Lee et al.

(10) Patent No.: US 8,325,595 B2
(45) Date of Patent: Dec. 4, 2012

(54) UPLINK PRECODING METHOD IN 2-TX SYSTEM

(75) Inventors: Moon Il Lee, Anyang-si (KR); Jae Hoon Chung, Anyang-si (KR); Hyun Soo Ko, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 12/704,467

(22) Filed: Feb. 11, 2010

(65) Prior Publication Data

US 2010/0208578 A1 Aug. 19, 2010

Related U.S. Application Data

(60) Provisional application No. 61/152,476, filed on Feb. 13, 2009, provisional application No. 61/153,943, filed on Feb. 19, 2009.

(30) Foreign Application Priority Data

Nov. 25, 2009 (KR) .......................... 10-2009-0114495

(51) Int. Cl.
*H04J 11/00* (2006.01)

(52) U.S. Cl. ........................................ 370/210; 370/319
(58) Field of Classification Search .................. 370/319, 370/210; 375/267, 295, 299, 260; 455/69
See application file for complete search history.

(56) References Cited

U.S. PATENT DOCUMENTS

| 7,995,671 | B2 * | 8/2011 | Kim et al. ..................... 375/267 |
| 8,050,357 | B2 * | 11/2011 | Clerckx et al. ................ 375/299 |
| 2008/0170523 | A1 | 7/2008 | Han et al. |
| 2008/0192849 | A1 | 8/2008 | Kim et al. |

* cited by examiner

*Primary Examiner* — Chandrahas Patel
(74) *Attorney, Agent, or Firm* — Lee, Hong, Degerman, Kang & Waimey

(57) ABSTRACT

A method for a user equipment to precode and transmit an uplink signal efficiently in a 2-antenna system and a method for a base station to receive the transmitted signal efficiently are disclosed. A 2-antenna codebook includes 4 DFT matrixes and 2 antenna selection matrixes for a rank 1 and one identity matrix for a rank 2 as precoding matrixes. For efficient uplink signal transmission/reception, the present invention provides signal transceiving technology between user equipment and base station using the 2-antenna codebook.

7 Claims, 4 Drawing Sheets

UPLINK PRECODING METHOD IN 2-TX SYSTEM

CROSS REFERENCE TO RELATED APPLICATIONS

This application claims the benefit of earlier filing date and right of priority to Korean Application No. 10-2009-0114495, filed on Nov. 25, 2009, the contents of which are hereby incorporated by reference herein in their entirety. This application further claims the benefit of U.S. Provisional Application Ser. Nos. 61/152,476, filed on Feb. 13, 2009, and 61/153,943, filed on Feb. 19, 2009, the contents of all of which are hereby incorporated by reference herein in their entirety.

BACKGROUND OF THE INVENTION

1. Field of the Invention

The present invention relates to a technology for transmitting/receiving signals through precoding in a mobile communication system, and more particularly, to a method for a user equipment to precode and transmit an uplink signal efficiently in a 2-antenna system and a method for a base station to receive the transmitted signal efficiently.

2. Discussion of the Related Art

In a multi-antenna or MIMO system, precoding provides high peak/average system throughput by providing a beamforming gain and a diversity gain to a transmitting/receiving side. Yet, a precoding scheme needs to be appropriately designed in consideration of antenna setting, channel configuration, system structure and the like.

Generally, an MIMO system performs precoding to minimize complexity and control signaling overhead using a codebook based precoding scheme. In this case, a codebook includes a scribed number of precoding vectors/matrixes predetermined between transmitting and receiving sides according to a transmission rank and the number of antennas. The transmitting side selects a specific vector/matrix within the codebook according to channel status information received from the receiving side, perform precoding on a transmission signal, and then transmits the precoded signal. Occasionally, the transmitting side selects a precoding matrix according to a predetermined rule instead of receiving the channel status information from the receiving side, performs precoding and is then able to transmit a corresponding signal.

Figure 1:
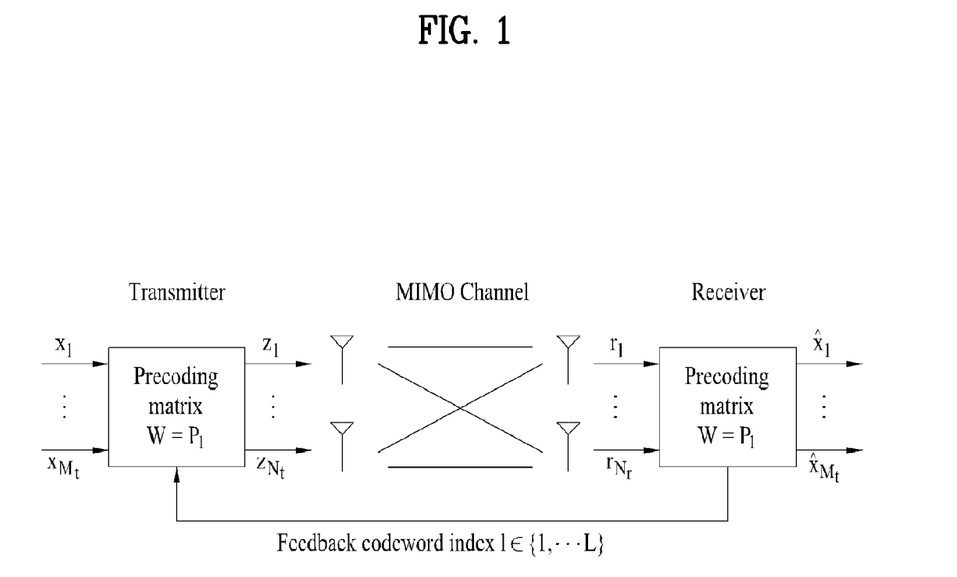
FIG. 1 is a diagram for explaining a basic concept of codebook based precoding.

FIG. 1 is a diagram for explaining a basic concept of codebook based precoding.

According to a codebook based precoding scheme, as mentioned in the foregoing description, a transmitting side and a receiving side share codebook information including a prescribed number of precoding matrixes predetermined according to a transmission rank, the number of antennas and the like with each other. The receiving side measures a channel status via a received signal and is then able to feed back preferred precoding matrix information to the transmitting side based on the aforesaid codebook information. FIG. 1 shows that the receiving side transmits preferred precoding matrix information per codeword to the transmitting side, for example.

Having received the feedback information from the receiving side, the transmitting side is able to select a specific precoding matrix from the codebook based on the received information. Having selected the precoding matrix, the transmitting side performs precoding in a manner of multiplying layer signals, of which number corresponds to a transmission rank, by the selected precoding matrix. And, the transmitting side is able to transmit the precoded transmission signal via a plurality of antennas. Having received the signal precoded and transmitted by the transmitting side, the receiving side is able to reconstruct the received signal by performing a process reverse to the precoding performed by the transmitting side. As a precoding matrix generally meets such a condition of a unitary matrix (U) as $U*U^H=I$, the reverse processing of the above precoding can be performed in a manner of multiplying a received signal by Hermitian ($P^H$) of a precoding matrix (P) used for the precoding of the transmitting side.

In 3GPP LTE ($3^{RD}$ Generation Partnership Project Long Term Evolution) release 8 system, in case of applying MIMO scheme to an uplink signal transmission to a base station from a user equipment, an MIMO transmission scheme is prescribed for a downlink signal transmission from a base station to a user equipment only due to such a problem as PAPR/CM (peak-to-average ratio/cubic metric) property degradation and the like. Yet, an uplink signal transmitted by a user equipment to a base station is ongoing to be discussed in a direction of applying MIMO scheme for transmission rate increase, diversity gain acquisition and the like. And, a next standard of 3GPP LTE system is ongoing to discuss about a detailed method of applying MIMO scheme to an uplink signal transmission.

SUMMARY OF THE INVENTION

Accordingly, the present invention is directed to an uplink precoding method in 2-Tx system that substantially obviates one or more problems due to limitations and disadvantages of the related art.

An object of the present invention is to provide a codebook for uplink precoding, and more particularly, a codebook suitable for a user equipment to precode and transmit a signal efficiently using 2 antennas.

Another object of the present invention is to provide a method of transmitting a signal to a base station from a user equipment using 2 antennas.

The technical objects realized and attained by the present invention are non-limited to the above mentioned objects. And, other unmentioned technical tasks can be taken into consideration by those having ordinary skill in the art, to which the present invention pertains, upon examination of the following embodiments of the present invention.

To achieve these objects and other advantages and in accordance with the purpose of the invention, as embodied and broadly described herein, a method of transmitting a signal, which is transmitted to a base station by a user equipment configured to use 2 antennas, according to the present invention includes the steps of obtaining transmission rank information, outputting a precoded signal precoded by selecting one precoding matrix corresponding to the transmission rank from a 2-antenna codebook including 4 DFT matrixes and 2 antenna selection matrixes for a rank 1 and one identity matrix for a rank 2 as precoding matrixes and then performing precoding on layer signals of which number corresponds to the transmission rank, and transmitting the precoded signal to the base station.

In another aspect of the present invention, a method of receiving a signal, which is received by a base station from a user equipment configured to use 2 antennas, includes the steps of receiving a reception signal from the user equipment, obtaining transmission rank and precoding matrix identification information used by the user equipment for the reception signal transmission, and performing reverse processing of precoding on the reception signal by selecting one precoding matrix corresponding to the transmission rank and precoding matrix identification information from a 2-antenna codebook including 4 DFT matrixes and 2 antenna selection matrixes for a rank 1 and one identity matrix for a rank 2 as precoding matrixes.

In another aspect of the present invention, a user equipment includes a memory configured to store a 2-antenna codebook including 4 DFT matrixes and 2 antenna, selection matrixes for a rank 1 and one identity matrix for a rank 2 as precoding matrixes, a precoder outputting a signal precoded by selecting one precoding matrix corresponding to a transmission rank from the 2-antenna codebook and then performing precoding on layer signals of which number corresponds to the transmission rank, and 2 antennas configured to be used to transmit the signal precoded by the precoder to a base station.

In a further aspect of the present invention, a base station includes an antenna configured to receive a reception signal transmitted from a user equipment, a memory configured to store a 2-antenna codebook including 4 DFT matrixes and 2 antenna selection matrixes for a rank 1 and one identity matrix for a rank 2 as precoding matrixes, and a precoder performing reverse processing of precoding on the reception signal received via the antenna by selecting one precoding matrix corresponding to transmission rank and precoding matrix identification information used by the user equipment from the 2-antenna codebook stored in the memory.

Preferably, the 2-antenna codebook includes 6

$$\begin{bmatrix}1\\0\end{bmatrix}, \begin{bmatrix}1\\1\end{bmatrix}, \begin{bmatrix}1\\-1\end{bmatrix}, \begin{bmatrix}1\\j\end{bmatrix}, \begin{bmatrix}1\\-j\end{bmatrix}, \begin{bmatrix}0\\1\end{bmatrix}$$

precoding matrixes such as
for the rank 1 or precoding matrixes resulting from multiplying the 6 precoding matrixes by a constant.

Preferably, the 2 antenna selection matrixes are configured to transmit the precoded signal to the base station using a half of a maximum available transmission power of the user equipment.

Preferably, the 2-antenna codebook includes 6

$$\frac{1}{\sqrt{2}}\begin{bmatrix}1\\0\end{bmatrix}, \frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \frac{1}{\sqrt{2}}\begin{bmatrix}1\\-j\end{bmatrix}, \frac{1}{\sqrt{2}}\begin{bmatrix}0\\1\end{bmatrix}$$

precoding matrixes such as for the rank 1.

More preferably, the 2 antenna selection matrixes are used for the precoding by being selected if one of the 2 antennas of the user equipment is used only.

Preferably, the 2-antenna codebook includes 1 precoding matrix such as $$\frac{1}{\sqrt{2}}\begin{bmatrix}1 & 0\\0 & 1\end{bmatrix}$$

for the rank 2.

And, the memory of the user equipment or the base station can be configured to store the above-described codebook.

Accordingly, the present invention provides the following effects and/or advantages.

First of all, the present invention prevents degradation of PAPR/CM property generated from applying MIMO scheme to uplink signal transmission as well as minimizes signaling overhead.

Secondly, if a user holds a user equipment in hand in a manner of covering a specific antenna of the user equipment, the present invention is able to set antenna power to be efficiently usable.

Effects attainable from the embodiments of the present invention are non-limited to the above-mentioned effects. Other unmentioned effects can be clearly derived and understood from the description of the following embodiments of the present invention by those having ordinary skill in the art to which the present invention pertains. Namely, effects unintended in the application stage of the present invention can be derived from the embodiments of the present invention by those having ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

As mentioned in the foregoing description, proposed in the following description is a codebook for uplink precoding, and more particularly, a codebook for enabling a user equipment configured to use 2 antennas to efficiently precode and transmit a signal. For this, a scheme of transmitting a downlink signal by MIMO in 3GPP LTE system is examined and a codebook suitable for an uplink signal transmission situation is then proposed in contrast with the examined scheme.

Figure 2:
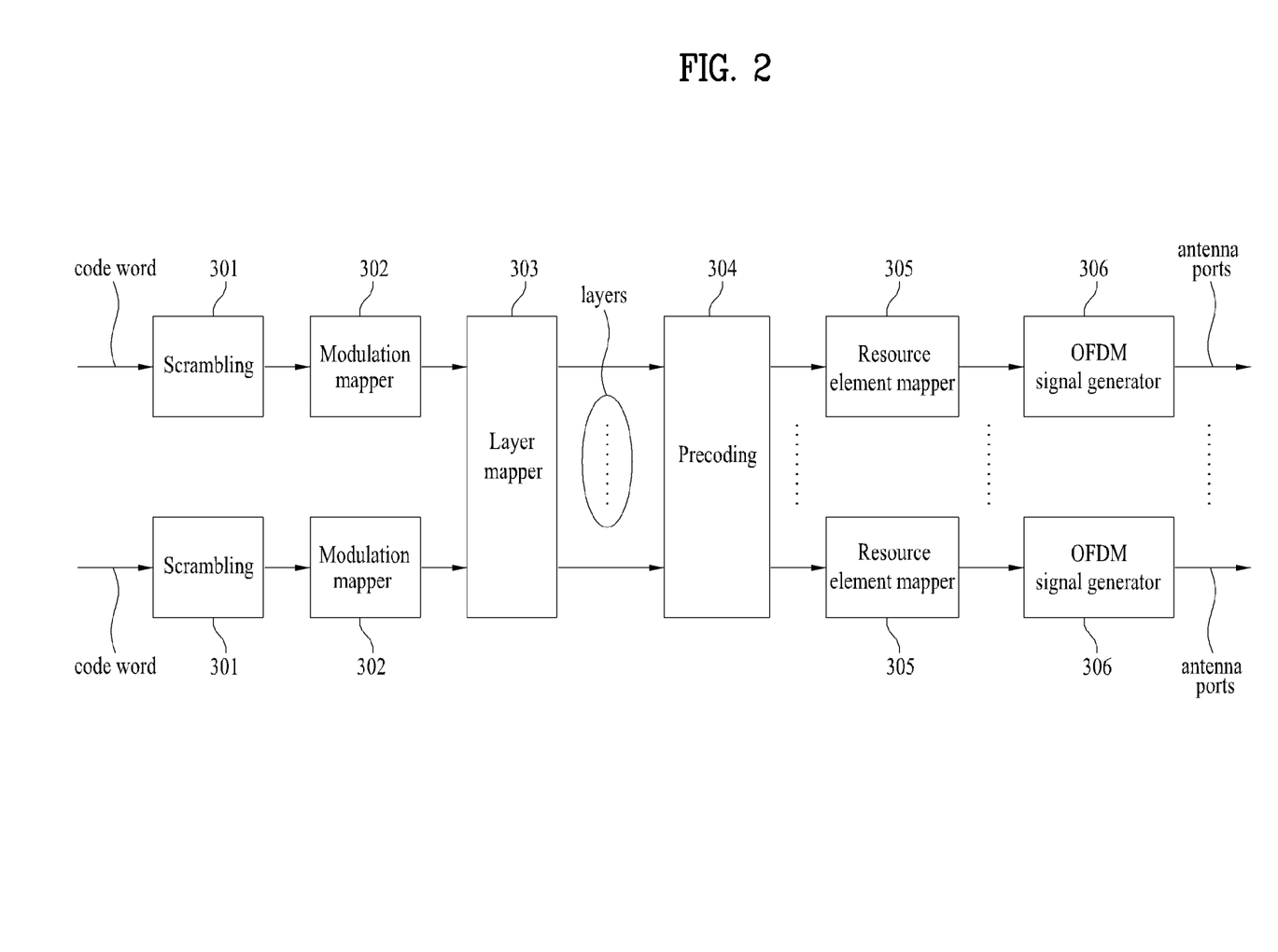
FIG. 2 is a diagram for explaining a signal processing process for transmitting a downlink signal from a base station.

FIG. 2 is a diagram for explaining a signal processing process for transmitting a downlink signal from a base station.

Referring to FIG. 2, in 3GPP LTE system, a base station is able to transmit at least one or more codewords in downlink. Each of the at least one or more codewords can be processed into a complex symbol through a scrambling module 301 and a modulation mapper 302. The complex symbol is mapped to a plurality of layers by a layer mapper 303. Each of the layers is multiplied by a prescribed precoding matrix selected according to a channel status by a precoding module 304 and is then allocated to a corresponding transmitting antenna. A transmission signal allocated to the corresponding antenna is mapped to a time-frequency resource element, which will be used for transmission, by a corresponding resource element mapper 305, enters an OFDM signal generator 306, and is then transmitted via the corresponding antenna.

SC-FDMA scheme is used for uplink signal transmission to enhance PAPR/CM property, whereas OFDM signal transmission is applied to downlink signal transmission.

Figure 3:
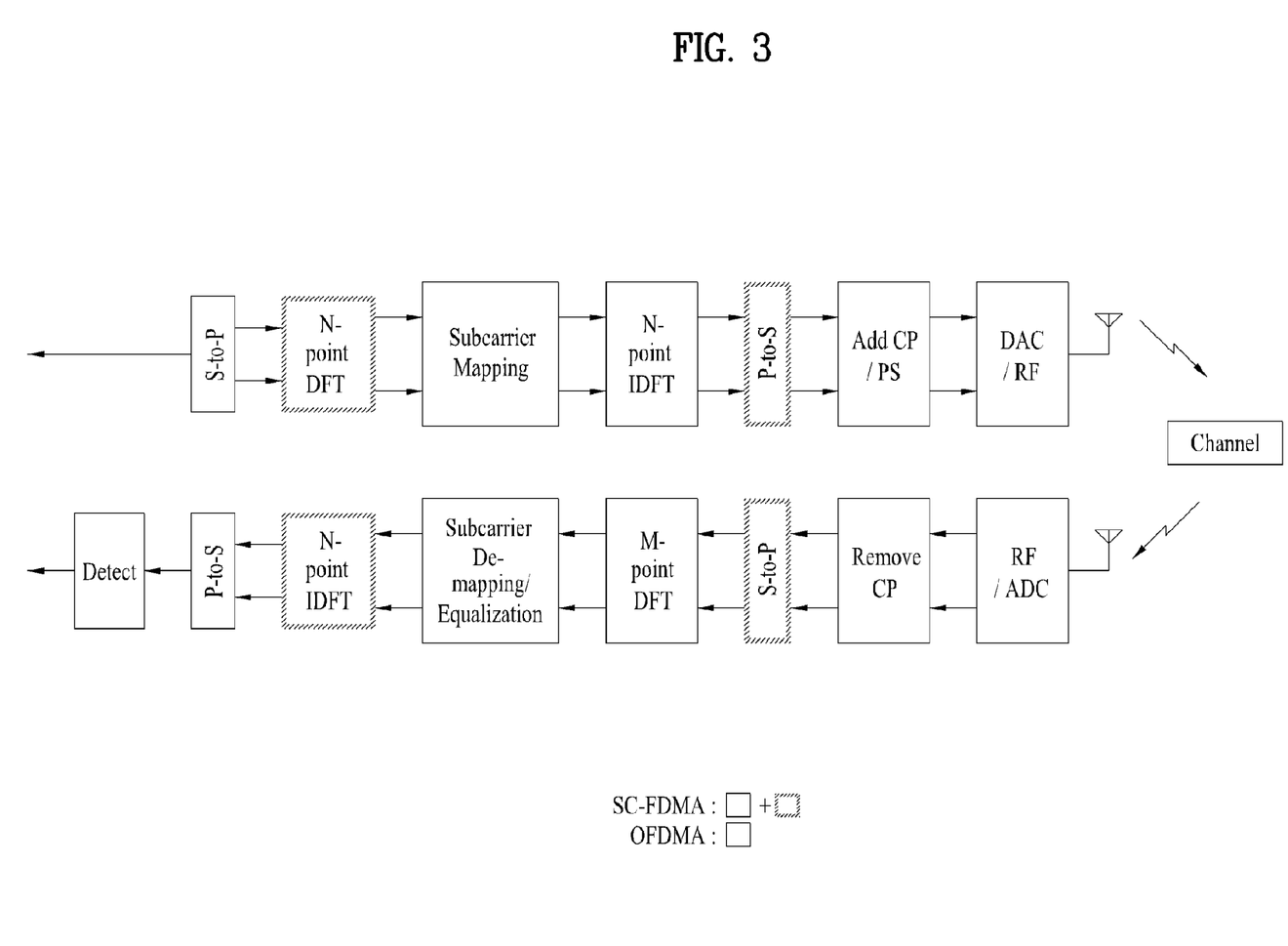
FIG. 3 is a diagram for explaining general SC-FDMA.

FIG. 3 is a diagram for explaining general SC-FDMA.

Referring to FIG. 3, in both OFDM and SC-FDMA schemes, a serial signal is converted to a parallel signal, the parallel signal is mapped by a subcarrier, IDFT or IFFT is performed thereon, the signal is converted to a serial signal again, a CP is attached to the serial signal, and the corresponding signal is then transmitted via an RF module. Yet, the SC-FDMA scheme is characterized in reducing influence of IDFT or IFFT processing through DFP spreading after conversion to a serial signal from a parallel signal and maintaining a single signal property over a predetermined level.

In consideration of this uplink situation, an uplink codebook according to the present invention is explained as follows.

First of all, 'rank 1' of an uplink 2Tx system is explained. In case of 2Tx-rank 1, a transmission signal precoding process can be represented as follows.

$$y = \begin{bmatrix} y_1 \\ y_2 \end{bmatrix} = P \cdot x = \begin{bmatrix} a \\ b \end{bmatrix} \cdot [x_1] = \begin{bmatrix} ax_1 \\ bx_1 \end{bmatrix} \quad \text{[Formula 1]}$$

In Formula 1, a matrix x indicates a transmission symbol and a matrix y indicates a precoded transmission symbol.

Assuming that wideband precoding is used in general, since a signal of each layer is multiplied by a specific constant in rank-1 precoding, a value of PAPR or CM of a signal transmitted via each antenna in 2Tx is equal to that of PAPR or CM of a signal transmitted in 1Tx. Hence, in using wideband precoding, PAPR or CM is not affected by a value of 2Tx-rank 1 precoding matrix.

Precoding is a method of changing a channel to enable a signal carried on each channel to become mutually constructive. Hence, signal transmission efficiency is enhanced. In formula 1, a first element 'a' of P is set to 1 and a second element 'b' can be set to an arbitrary value. Moreover, by equalizing a power of a signal transmitted via each antenna, it is able to maximally use a power amplifier provided to each antenna. For this, the second element can be set to a complex number value of which absolute value is 1. Namely, the precoding matrix P in Formula 1 can be represented as follows.

$$P = \begin{bmatrix} 1 \\ e^{j\theta} \end{bmatrix} \quad \text{[Formula 2]}$$

Meanwhile, limitation is put on the number of precoding matrixes included in a codebook used for precoding. This is because both a transmitting stage and a receiving stage should have codebooks and because information on a prescribed precoding matrix is exchanged occasionally. Preferably, a limited number of precoding matrixes are used. According to the present embodiment, a value of θ in Formula is limited to +0°, +90°, +180° or −90° and 2Tx-rank 1 codebook is set to include four DFT matrixes shown in the following.

$$\begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \quad \text{[Formula 3]}$$

According to the present embodiment, in consideration of a case that a user holds a user equipment in hand by covering a specific antenna of the ser equipment for rank 1 of an uplink 2Tx system, proposed is a method of setting two antenna selection matrixes to be additionally included in a manner that a signal is transmitted via a specific one of two antennas.

$$\begin{bmatrix} 1 \\ 0 \end{bmatrix} \begin{bmatrix} 0 \\ 1 \end{bmatrix} \quad \text{[Formula 4]}$$

Hence, 2Tx-rank 1 codebook according to the present embodiment can be represented as follows.

$$\left\{ \begin{bmatrix} 1 \\ 0 \end{bmatrix}, \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix}, \begin{bmatrix} 0 \\ 1 \end{bmatrix} \right\} \quad \text{[Formula 5]}$$

In the following description, a rank 2 (i.e., full rank) of an uplink 2Tx system is explained.

First of all, in case of 2Tx-rank 2, Formula 2 can be rewritten into Formula 6.

$$y = \begin{bmatrix} y_1 \\ y_2 \end{bmatrix} = P \cdot x = \begin{bmatrix} p_{11} & p_{12} \\ p_{21} & p_{22} \end{bmatrix} \cdot \begin{bmatrix} x_1 \\ x_2 \end{bmatrix} = \begin{bmatrix} p_{11}x_1 + p_{12}x_2 \\ p_{21}x_1 + p_{22}x_2 \end{bmatrix} \quad \text{[Formula 6]}$$

In Formula 6, a signal $y_k$ transmitted via an antenna is constructed with a combination of plural input signals $x_i$, which may raise a CM value.

If $p_{12}$ and $p_{21}$ (or $p_{11}$ and $p_{22}$) are set to 0, each antenna is enabled to transmit one signal only. Therefore, if a CM value of a signal $x_i$ is good, a CM value of a precoded signal becomes good as well. Currently, in 3GPP LTE-A, after a codeword has been mapped to a layer, DFT spreading is performed on the signal mapped to the corresponding layer, the DFT-spread signal is precoded, and the precoded signal is then transmitted via a corresponding antenna. If one layer signal is made to be transmitted per antenna in the precoding step, there is an effect IDFT or IFFT processing is performed right after DFT processing. Therefore, PAPR or CM property can be maintained good. Accordingly, according to the present embodiment, proposed is a 2Tx-rank 2 codebook of which structure includes one identity matrix as follows.

$$\begin{bmatrix} 1 & 0 \\ 0 & 1 \end{bmatrix} \quad \text{[Formula 7]}$$

If such a precoding matrix as Formula 7 is used, it is able to prevent degradation of PAPR/CM property in uplink. And, it is able to minimize a signaling overhead.

In brief, an uplink 2Tx codebook structure according to the present embodiment can be represented as follows.

TABLE 1

| Rank | Precoding matrix |
|---|---|
| 1 | $\left\{ \begin{bmatrix} 1 \\ 0 \end{bmatrix}, \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix}, \begin{bmatrix} 0 \\ 1 \end{bmatrix} \right\}$ |
| 2 | $\begin{bmatrix} 1 & 0 \\ 0 & 1 \end{bmatrix}$ |

Namely, a 2Tx codebook according to the present embodiment includes 4 DT matrixes and 2 antenna selection matrixes for rank 1 and also includes one identity matrix for rank 2. A user equipment selects a specific precoding matrix according to a transmission rank using this codebook, performs precoding on layer signals of which number corresponds to the transmission rank, and is then able to transmit the corresponding signal to a base station.

Meanwhile, precoding matrixes within a codebook can be normalized to have equal transmission power as follows.

TABLE 2

| Rank | Precoding matrix |
|---|---|
| 1 | $\left\{ \begin{bmatrix} 1 \\ 0 \end{bmatrix}, \frac{1}{\sqrt{2}}\begin{bmatrix} 1 \\ 1 \end{bmatrix}, \frac{1}{\sqrt{2}}\begin{bmatrix} 1 \\ -1 \end{bmatrix}, \frac{1}{\sqrt{2}}\begin{bmatrix} 1 \\ j \end{bmatrix}, \frac{1}{\sqrt{2}}\begin{bmatrix} 1 \\ -j \end{bmatrix}, \begin{bmatrix} 0 \\ 1 \end{bmatrix} \right\}$ |
| 2 | $\frac{1}{\sqrt{2}}\begin{bmatrix} 1 & 0 \\ 0 & 1 \end{bmatrix}$ |

The codebook shown in Table 2 is set to use the same transmission power no matter what kind of precoding matrix is used. In particular, no matter a DFT matrix or an antenna selection matrix is used for the rank 1, it is set to equally use a total available power.

Yet, when a user holds a user equipment in hand by covering a specific antenna, a case of transmitting a signal using an available antenna through an antenna selection matrix is explained in detail as follows. First of all, when one antenna is used only, if a power range handled by a power amplifier of each antenna is set twice to prepare for a case that a total available power is concentrated on a signal via one antenna, it may be wasteful. Namely, as a user holds a user equipment in hand by covering a specific antenna, even if a specific antenna is available only, a power range is set to a maximum power range available for a case of using two antennas. And, it may be more advantageous in reducing a product cost of the user equipment. Therefore, according to another embodiment of the present invention, in case of using an antenna selection matrix, proposed is a method of setting each antenna amplifier requirement equally using a half of a total available power. A 2Tx codebook according to this embodiment can be represented as follows.

TABLE 3

| Rank | Precoding matrix |
|---|---|
| 1 | $\frac{1}{\sqrt{2}}\begin{bmatrix} 1 \\ 0 \end{bmatrix}, \frac{1}{\sqrt{2}}\begin{bmatrix} 1 \\ 1 \end{bmatrix}, \frac{1}{\sqrt{2}}\begin{bmatrix} 1 \\ -1 \end{bmatrix}, \frac{1}{\sqrt{2}}\begin{bmatrix} 1 \\ j \end{bmatrix}, \frac{1}{\sqrt{2}}\begin{bmatrix} 1 \\ -j \end{bmatrix}, \frac{1}{\sqrt{2}}\begin{bmatrix} 0 \\ 1 \end{bmatrix}$ |
| 2 | $\frac{1}{\sqrt{2}}\begin{bmatrix} 1 & 0 \\ 0 & 1 \end{bmatrix}$ |

A user equipment according to the present embodiment performs precoding on a transmission signal using the above-described codebook and is then able to transmit the corresponding signal to a base station. The base station provided with the same codebook of the user equipment uses a transmission rank and identification information on a precoding matrix used by the user equipment and is able to reconstruct a received signal by performing a reverse process of the precoding using Hermitian matrix of the same matrix used in performing the precoding by the user equipment.

In the following description, a base station and a user equipment, which use the above described codebook, are explained.

Figure 4:
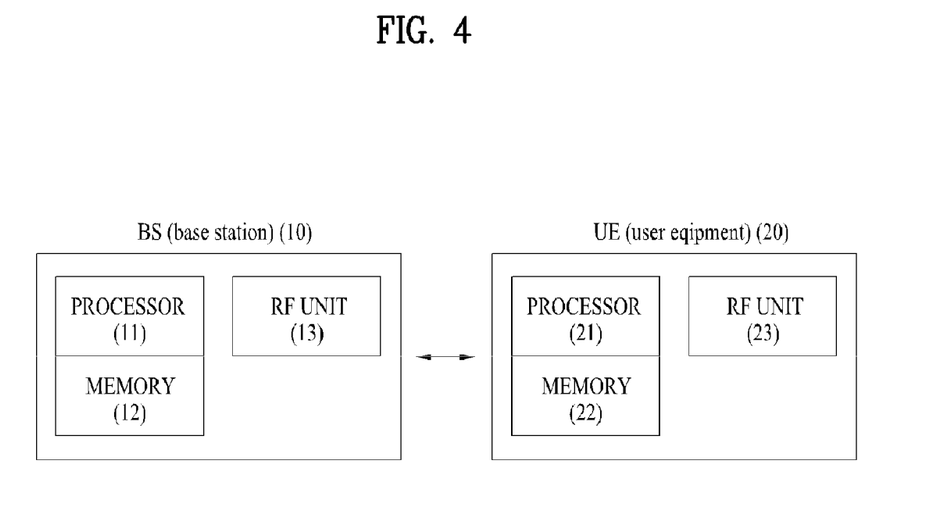
FIG. 4 is a diagram for configurations of a base station and a user equipment.

FIG. 4 is a diagram for configurations of a base station and a user equipment.

Referring to FIG. 4, a base station 10 can include a processor 11, a memory 12 and an RF module 13 as a transceiving module for performing a reception of an uplink signal and a transmission of a downlink signal. The processor controls the downlink signal transmission using information, which is stored in the memory 12 for the downlink signal transmission, e.g., a specific precoding matrix within a codebook for the downlink signal transmission. And, the processor 11 of the base station 10 is able to control the downlink signal reception using information stored in the memory 12 for the uplink signal reception. For instance, the processor 11 is able to control a signal receiving process for multiplying an uplink signal by Hermitian matrix of the same precoding matrix used by a user equipment 20 as a reverse process of precoding. The memory 12 of the base station 10 according to the present embodiment is proposed to store the codebook shown in Table 2 or Table 3 as an uplink 2Tx codebook. Moreover, a functionality module for performing a precoding relevant function of the processor 11 can be separately configured with a precoder (not shown in the drawing).

The user equipment 20 can include a processor 21, a memory 22 and an RF module 23 as a transceiving module for performing a transmission of an uplink signal and a reception of a downlink signal. The processor 21 controls the uplink signal transmission using information, which is stored in the memory 22 for the uplink signal transmission, e.g., a specific precoding matrix within a codebook for the uplink signal transmission, as mentioned in the foregoing description of the embodiment for the uplink signal transmission. And, the processor 21 is able to control the downlink signal reception using information stored in the memory 22 for the downlink signal reception. For instance, the processor 21 is able to control a signal receiving process for multiplying an uplink signal by Hermitian matrix of the same precoding matrix used by the base station 10 as a reverse process of precoding.

The memory 22 of the user equipment 20 according to the present embodiment is proposed to store the codebook shown in Table 2 or Table 3 as an uplink 2Tx codebook.

Moreover, a functionality module for performing a precoding relevant function of the processor 21 can be separately configured with a precoder (not shown in the drawing).

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

Accordingly, the above description is mainly made with reference to a case of a follow-up model of 3GPP LTE system, e.g., a case of 3GPP LTE-A system. And, the present invention is a next generation mobile communication technology and is applicable to IEEE series or systems according to other standards by the same principle.

What is claimed is:

1. A method of transmitting a signal by a user equipment configured to use two antennas, the method comprising:
obtaining transmission rank information;
outputting a precoded signal by precoding a number of layer signals, the number corresponding to a transmission rank, and using a specific precoding matrix corresponding to the transmission rank, wherein the specific precoding matrix is selected from a two-antenna codebook; and
transmitting the precoded signal,
wherein the two-antenna codebook includes six precoding matrixes such as $$\frac{1}{\sqrt{2}}\begin{bmatrix}1\\0\end{bmatrix}, \frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \frac{1}{\sqrt{2}}\begin{bmatrix}1\\-j\end{bmatrix}, \frac{1}{\sqrt{2}}\begin{bmatrix}0\\1\end{bmatrix}$$

for the transmission rank 1 and one precoding matrix such as $$\frac{1}{\sqrt{2}}\begin{bmatrix}1 & 0\\0 & 1\end{bmatrix}$$

for the transmission rank 2.

2. The method of claim 1, wherein $$\frac{1}{\sqrt{2}}\begin{bmatrix}1\\0\end{bmatrix}, \frac{1}{\sqrt{2}}\begin{bmatrix}1\\1\end{bmatrix}$$

of the six precoding matrixes for the transmission rank 1 are antenna selection matrixes configured to transmit the precoded signal using one-half a maximum available transmission power of the user equipment.

3. The method of claim 2, wherein the antenna selection matrixes are used for precoding, when only one of the two antennas of the user equipment is used.

4. A user equipment comprising:
a memory configured to store a two-antenna codebook;
a precoder configured to precode and output a signal, the signal precoded by precoding a number of layer signals, the number corresponding to a transmission rank, and by using a specific precoding matrix corresponding to the transmission rank from the two-antenna codebook; and
two antennas configured to transmit the precoded signal,
wherein the two-antenna codebook includes six precoding matrixes such as $$\frac{1}{\sqrt{2}}\begin{bmatrix}1\\0\end{bmatrix}, \frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \frac{1}{\sqrt{2}}\begin{bmatrix}1\\-j\end{bmatrix}, \frac{1}{\sqrt{2}}\begin{bmatrix}0\\1\end{bmatrix}$$

for the transmission rank 1 and one precoding matrix such as $$\frac{1}{\sqrt{2}}\begin{bmatrix}1 & 0\\0 & 1\end{bmatrix}$$

for the transmission rank 2.

5. The user equipment of claim 4, wherein $$\frac{1}{\sqrt{2}}\begin{bmatrix}1\\0\end{bmatrix}, \frac{1}{\sqrt{2}}\begin{bmatrix}1\\1\end{bmatrix}$$

of the six precoding matrixes for the transmission rank 1 are antenna selection matrixes configured to transmit the precoded signal using one-half a maximum available transmission power of the user equipment.

6. A base station comprising:
an antenna configured to receive a reception signal;
a memory configured to store a two-antenna codebook; and
a precoder performing an inverse process of precoding on the reception signal by using a specific precoding matrix corresponding a transmission rank and precoding matrix identification information from the two-antenna codebook stored in the memory,
wherein the two-antenna codebook includes six precoding matrixes such as $$\frac{1}{\sqrt{2}}\begin{bmatrix}1\\0\end{bmatrix}, \frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \frac{1}{\sqrt{2}}\begin{bmatrix}1\\-j\end{bmatrix}, \frac{1}{\sqrt{2}}\begin{bmatrix}0\\1\end{bmatrix}$$

for the transmission rank 1 and one precoding matrix such as $$\frac{1}{\sqrt{2}}\begin{bmatrix}1 & 0\\0 & 1\end{bmatrix}$$

for the transmission rank 2.

7. A method of receiving a signal by a base station, the method comprising:
receiving a reception signal;
obtaining transmission rank information and precoding matrix identification information used for the reception signal; and
performing an inverse process of precoding on the reception signal using a specific precoding matrix corresponding to a transmission rank and precoding matrix identification information, wherein the specific precoding matrix is selected from a two-antenna codebook,
wherein the two-antenna codebook includes six precoding matrixes such as $$\frac{1}{\sqrt{2}}\begin{bmatrix}1\\0\end{bmatrix}, \frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \frac{1}{\sqrt{2}}\begin{bmatrix}1\\-j\end{bmatrix}, \frac{1}{\sqrt{2}}\begin{bmatrix}0\\1\end{bmatrix}$$

for the transmission rank 1 and one precoding matrix such as $$\frac{1}{\sqrt{2}}\begin{bmatrix}1 & 0\\0 & 1\end{bmatrix}$$

for the transmission rank 2.

* * * * *

UNITED STATES PATENT AND TRADEMARK OFFICE
CERTIFICATE OF CORRECTION

PATENT NO. : 8,325,595 B2  
APPLICATION NO. : 12/704467  
DATED : December 4, 2012  
INVENTOR(S) : Lee et al.

Page 1 of 1

It is certified that error appears in the above-identified patent and that said Letters Patent is hereby corrected as shown below:

In the Claims

Col. 9, Line 27, replace Claim 2 with the following:

--2. The method of claim 1, wherein $\left[\left[\frac{1}{\sqrt{2}}\begin{bmatrix}1\\0\end{bmatrix},\frac{1}{\sqrt{2}}\begin{bmatrix}1\\1\end{bmatrix}\right]\right]$ $\frac{1}{\sqrt{2}}\begin{bmatrix}1\\0\end{bmatrix},\frac{1}{\sqrt{2}}\begin{bmatrix}0\\1\end{bmatrix}$ of the six precoding matrixes for the transmission rank 1 are antenna selection matrixes configured to transmit the precoded signal using one-half a maximum available transmission power of the user equipment.--.

Col. 10, Line 1, replace Claim 5 with the following:

--5. The user equipment of claim 11, wherein $\left[\left[\frac{1}{\sqrt{2}}\begin{bmatrix}1\\0\end{bmatrix},\frac{1}{\sqrt{2}}\begin{bmatrix}1\\1\end{bmatrix}\right]\right]$ $\frac{1}{\sqrt{2}}\begin{bmatrix}1\\0\end{bmatrix},\frac{1}{\sqrt{2}}\begin{bmatrix}0\\1\end{bmatrix}$ of the six precoding matrixes for the transmission rank 1 are antenna selection matrixes configured to transmit the precoded signal using one-half a maximum available transmission power of the user equipment.--.

Signed and Sealed this  
Twenty-ninth Day of July, 2014

Michelle K. Lee  
*Deputy Director of the United States Patent and Trademark Office*